June 23, 1970  R. W. SWEET  3,516,501
BALL AND SOCKET AND DEPTH CONTROL CONNECTION
FOR CULTIVATING IMPLEMENTS
Filed May 4, 1967  2 Sheets-Sheet 2

INVENTOR:
RALPH W SWEET

United States Patent Office 3,516,501
Patented June 23, 1970

3,516,501
BALL AND SOCKET AND DEPTH CONTROL CONNECTION FOR CULTIVATING IMPLEMENTS
Ralph W. Sweet, Forgan, Saskatchewan, Canada
Filed May 4, 1967, Ser. No. 636,166
Int. Cl. A01b 49/00
U.S. Cl. 172—314            6 Claims

ABSTRACT OF THE DISCLOSURE

This invention relates to means for connecting together a plurality of implement sections such as one-way discers and the like in which the leading end of one section is pivotally connected to the rudder beam of the preceding section, the point of pivotal connection of the said trailing end being in vertical alignment with the point of vertical pivot of the rear wheel of said rudder beam. Vertical adjustment is provided for the said leading end connection so that the section can be levelled without interfering with the levelling of the preceding section.

---

This invention relates to new and useful improvements in ball and socket connectors for adjacent implement sections.

Implements such as cultivators, one-way ploughs and the like, are often connected in echelon in order to make an implement of relatively wide width.

However, difficulty is encountered in adjusting the relative height of one section with respect to the other so that the cultivator blades or discs penetrate the same depth.

Difficulty is also encountered in ensuring that the rear wheel of the tail beam does not engage the front of the next adjacent section, particularly when the device is moved to the transport position.

I have overcome both of these disadvantages by providing a pivotal mounting for the rear wheel of the tail beam of one section to which is connected a connecting beam extending to the leading end of the next adjacent section and having a vertical adjustment incorporated therewith so that said leading edge is raised or lowered without affecting the relative height of the trailing end of the front section.

Of importance is the fact that the ball and socket connection between the adjacent sections is on a common vertical centre line with the adjustment for depth control.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein, with due regard to this connection being had to the accompanying figures in which.

In the drawings like characters of reference indicate corresponding parts in the different figures.

Figure 1:
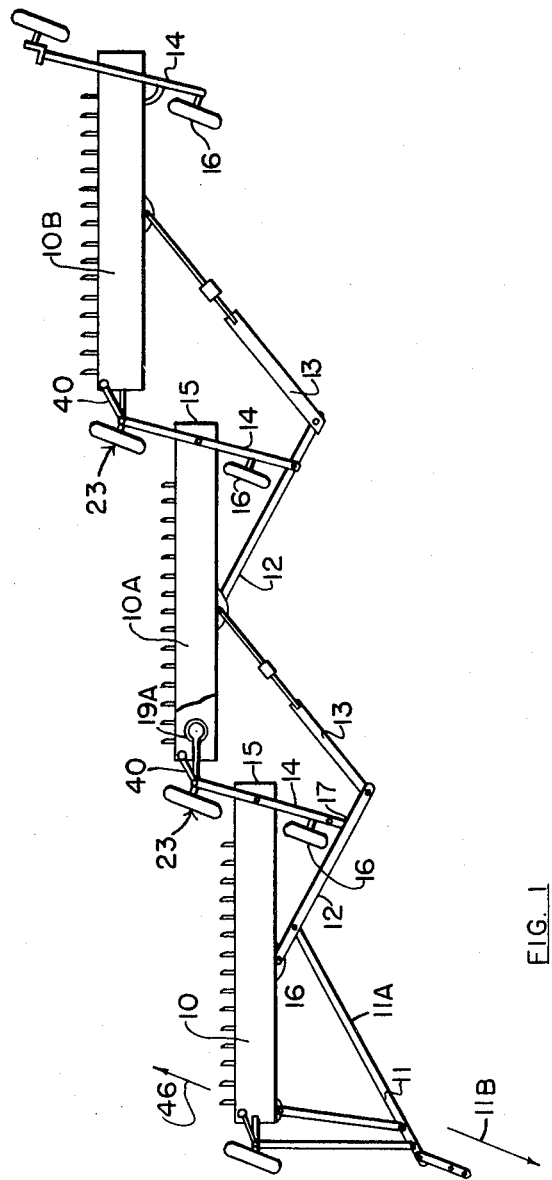
FIG. 1 is a plan partially schematic view showing adjacent cultivator sections connected together in echelon.

Proceeding therefore to describe the invention in detail, reference to FIG. 1 shows a plurality of cultivator sections 10, 10A and 10B together with draft assembly 11 extending to diagonal beam 12 and telescopic links 13 extending between the diagonal beam 12 and the next adjacent sections 10A and 10B, respectively. Tail beams 14 are pivotally connected between the ends thereof to the trailing ends 15 of the sections and these tail beams include a front castor wheel 16 and a connection as at 17 to the said diagonal beams 12.

Reference should be made to the remainder of the drawings in which the tail beams 14 are pivotally connected to the trailing end 18 of the main beam 19 of one of the sections 10, pivot pin 20 showing the connection of the tail beams 14 to the main beam 19.

Figure 2:
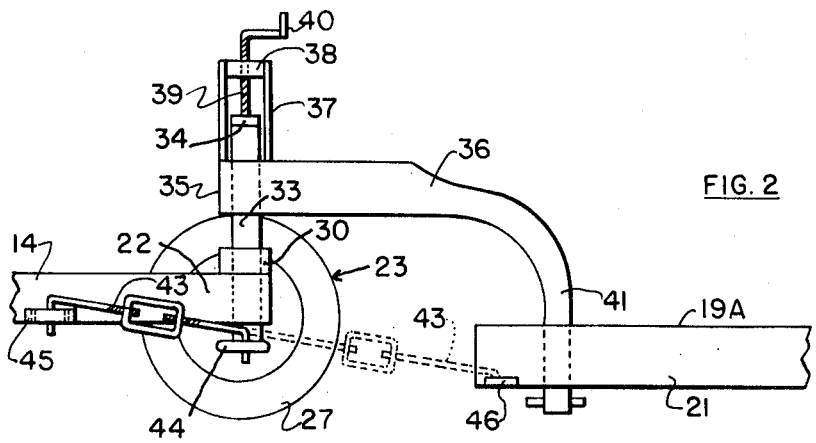
FIG. 2 is a fragmentary side elevation showing the connection of a following cultivator section with the tail beam of the next front adjacent section.

FIG. 2 shows the front end 21 of the main beam 19A of the next adjacent section, said main beam normally being parallel to the other main beams when the cultivator is in use.

Situated at the rear end 22 of the tail beam 14 is a wheel assembly 23 including a wheel hub assembly collectively designated 24. This consists of a plate 25 having a hub assembly 26 secured to one end thereof upon which wheel 27 is secured for rotation in the normal way.

A spindle 28 is secured to plate 25 and extends upwardly therefrom and engages the rear end 22 of the tail beam within which it is journalled for partial rotation.

A ball 29 is formed on the upper end of the spindle 28 and a socket block 30 engages the ball with lock plate 31 holding the socket block and ball together through bolts 32.

Extending upwardly from socket block 30 is a further spindle 33 having a first washer 34 on the upper end thereof.

This spindle 33 passes through the front end 35 of a connecting beam 36 which is journalled for partial rotation upon spindle 33.

A frame assembly 37 consisting of a pair of spaced and parallel plates, extends upwardly from the front end of the connecting beam 36 and a bridging piece 38 spans the upper ends of these plates. This bridging piece is drilled and screw-threaded to receive a jacking component 39 screw-threadably therewithin, said jacking component terminating in a handle portion 40 upon the upper portion thereof.

The lower end of the jacking component 39 operatively engages the upper end of spindle 33 through the agency of first washer 34.

The connecting beam 36 is in the form of a gooseneck and terminates in the downturned portion 41 which is journalled within the front or leading end 21 of the aforementioned main beam 19A.

From the foregoing it will be appreciated that the vertical relationship of the front end 21 of the main beam 19A may be adjusted with respect to the position of the trailing end 18 of the main beam 19 by rotating the jacking component 39.

Figures 3, 4:
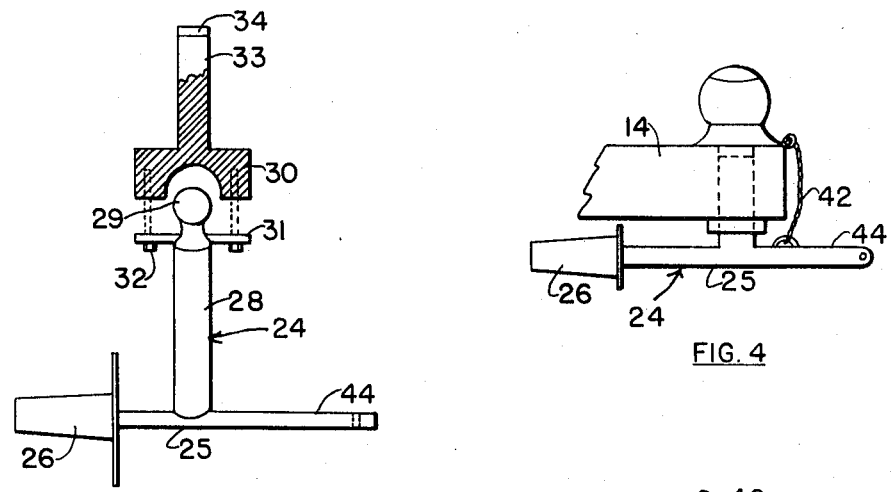
FIG. 3 is a side elevation of the wheel hub assembly of FIG. 2 and showing the ball and socket joint.
FIG. 4 is a fragmentary side elevation showing one method of retaining the wheel hub assembly within the tail beam.
Figure 5:
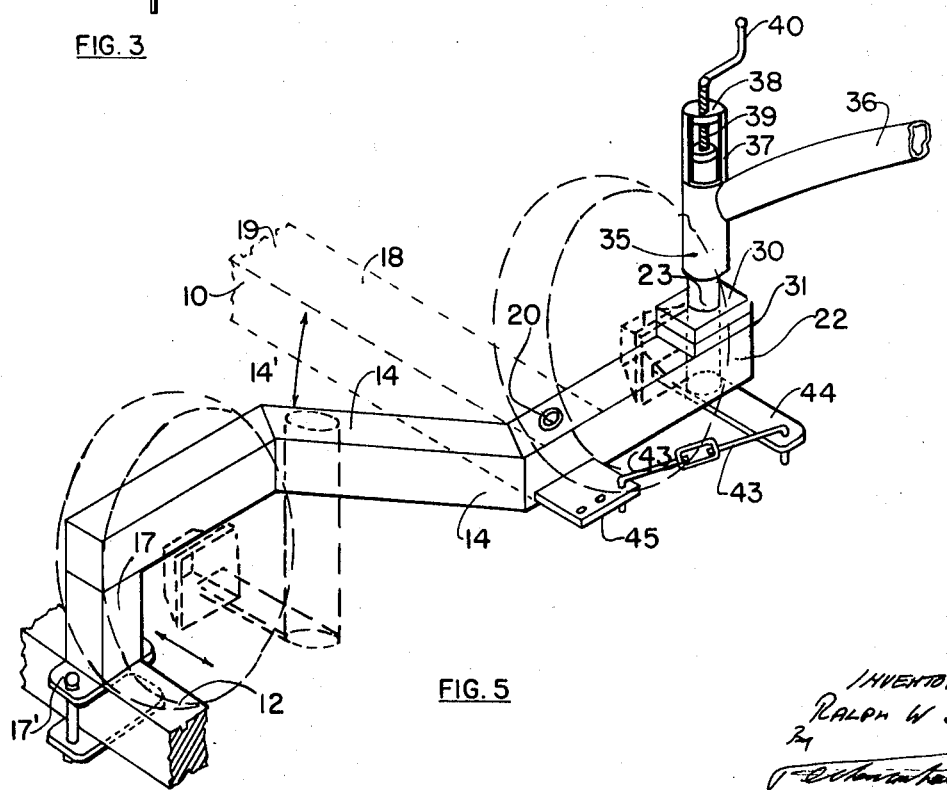
FIG. 5 is a fragmentary isometric view of the tail beam showing my device incorporated therein.

It is desirable to provide a chain 42 extending between the tail beam 14 and the plates 25 as shown in FIG. 4, to retain the wheel assembly within tail beam 14. Alternatively, the method shown in FIG. 3 may be utilized and this has the advantage of maintaining the socket block 30 in position.

An adjustable turnbuckle ring 43 extends from an offstanding lug 44 formed on plate 25, to either an apertured lug 45 situated on the tail beam 14 or, to a lug 46 situated on the front end 21 of the next adjacent main frame 19A and as shown in phantom in FIG. 2.

Either of these positions maintains the wheel 27 in the desired relationship with the frame member when the main frame and hence the components 10 and 10A, etc., are in alignment, as in the working position.

By adjusting the turnbuckle link 43, the direction of travel of the wheel assembly 27 is held in a fixed position.

However, if and when the operator wishes to move the machine into the full transport position, the telescopic links 13 are disconnected and the front unit 10 is moved in the direction of arrow 46' (see FIG. 1) in order to bring the assembly into the transport position. Under these circumstances, the rear end of the tail beam 14 could engage wheel 27 if the turnbuckle links 43 were anchored to lug 46 rather than 45.

It is therefore desirable to anchor it to lug 45 as shown in full section in FIG. 2, thus ensuring that the wheel assembly 27 follows the main frame 14 whether it is moved either in direction of arrow 46' or in the opposite direction.

When it is desired to adjust these various sections, it is normal to adjust the front end of the front section 10 in order to level this front section to soil so that the discs or cultivator blades penetrate evenly.

The next adjacent section is then levelled to the forward section without affecting the adjustment of the forward section and this continues rearwardly section by section until the entire machine has been adjusted to the desired level for operation.

The weight of the front end of each section acts upon the rear end of the tail beam 14 and helps to anchor same, particularly in view of the fact that the spindle support of the wheel assembly 27 and the connection of connecting beam 36 are in vertical alignment.

Referring back to the connection between the tail beam connection 17 to the diagonal beam 12, I prefer to make this connection adjustable by using clamp 17'. By loosening this clamp, the beam 14 can be swung to the right or left to position the angle 14' between the frame 19 and the beam 14 which in turn positions wheel 27 to the furrow.

In FIG. 4 an alternative construction is shown in which the ball 29 is welded to the tail beam 14. The spindle 28 and hub 26 is then engaged in a bearing in 14 so that there is a common center line to the ball 29 and the spindle 28.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What I claim to be the present invention is:

1. In a cultivator including a plurality of sections, said sections including a main frame, a tail beam pivotally connected between the ends thereof to the trailing end of said main frame, a castor wheel on the front end of said tail beam and a further wheel on the rear end of said tail beam, said further wheel including a wheel hub assembly; means to connect adjacent sections together in echelon, said means including a vertical spindle extending upwardly from said wheel hub assembly, said spindle being journalled for rotation in the rear end of said tail beam, and a connecting beam extending from said spindle to the leading end of the main frame of the next adjacent section, said spindle incorporating a ball and socket joint between said tail beam and said connecting beam, said connecting beam being pivotally connected to said main frame of the next adjacent section.

2. The device according to claim 1 which includes means to adjustably restrict the movement of said further wheel in a horizontal plane, said means comprising a lug offstanding from said wheel hub assembly and an adjustable link extending from said lug to said tail beam.

3. The device according to claim 1 which includes means to adjust the vertical relationship of said leading end of said adjacent main frame with respect to the trailing end of said main frame.

4. The device according to claim 2 which includes means to adjust the vertical relationship of said leading end of said adjacent main frame with respect to the trailing end of said main frame.

5. The device according to claim 3 in which said last mentioned means includes a bracket assembly secured to and extending upwardly from said connecting beam, said spindle being journalled in said connecting beam and extending therethrough, and a screw jack component engageable with said bracket assembly and operatively acting upon the upper end of said spindle to raise and lower said connecting beam and hence said leading end of said main frame with respect to said spindle.

6. The device according to claim 4 in which said last mentioned means includes a bracket assembly secured to and extending upwardly from said connecting beam, said spindle being journalled in said connecting beam and extending therethrough, and a screw jack component engageable with said bracket assembly and operatively acting upon the upper end of said spindle to raise and lower said connecting beam and hence said leading end of said main frame with respect to said spindle.

References Cited

UNITED STATES PATENTS

| | | | |
|---|---|---|---|
| 2,552,770 | 5/1951 | D'Artenay | 172—314 X |
| 3,066,746 | 12/1962 | Sweet | 172—284 |
| 3,410,569 | 11/1968 | Blake | 172—421 X |
| 1,054,885 | 4/1913 | Weiler | 172—314 X |
| 1,012,220 | 12/1911 | Pearson. | |

ROBERT E. PULFREY, Primary Examiner

R. C. HARRINGTON, Assistant Examiner

U.S. Cl. X.R.

172—587, 669